May 19, 1970     I. V. K. HOTT ET AL     3,512,599
ENGINE DRIVEN SCOOTER
Filed Dec. 21, 1967     3 Sheets-Sheet 1
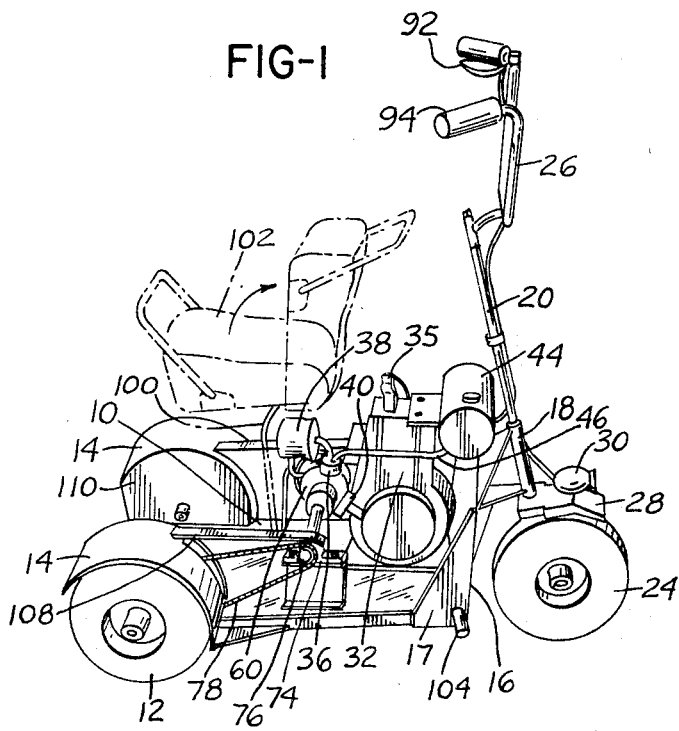
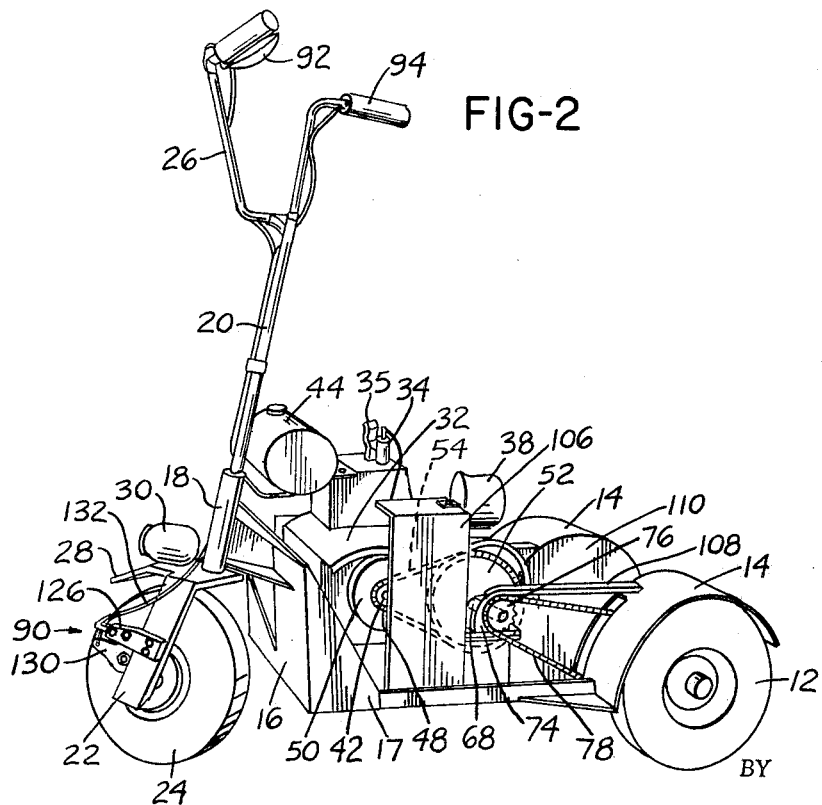
INVENTORS:
Ion V. K. Hott
Robert J. Haddix
BY

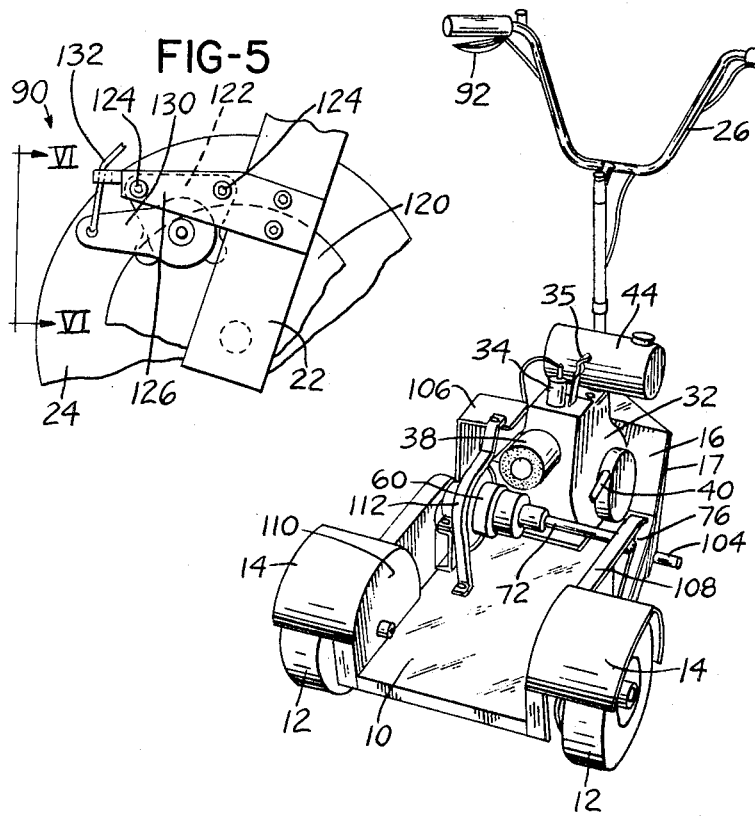
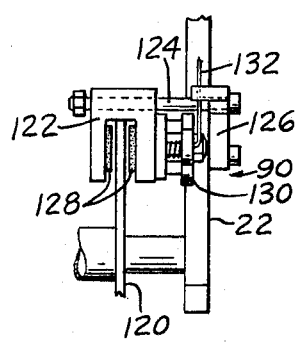
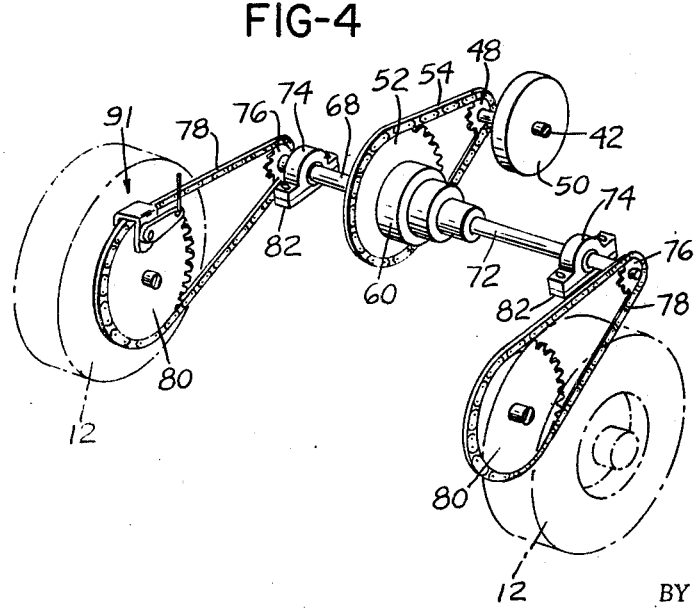

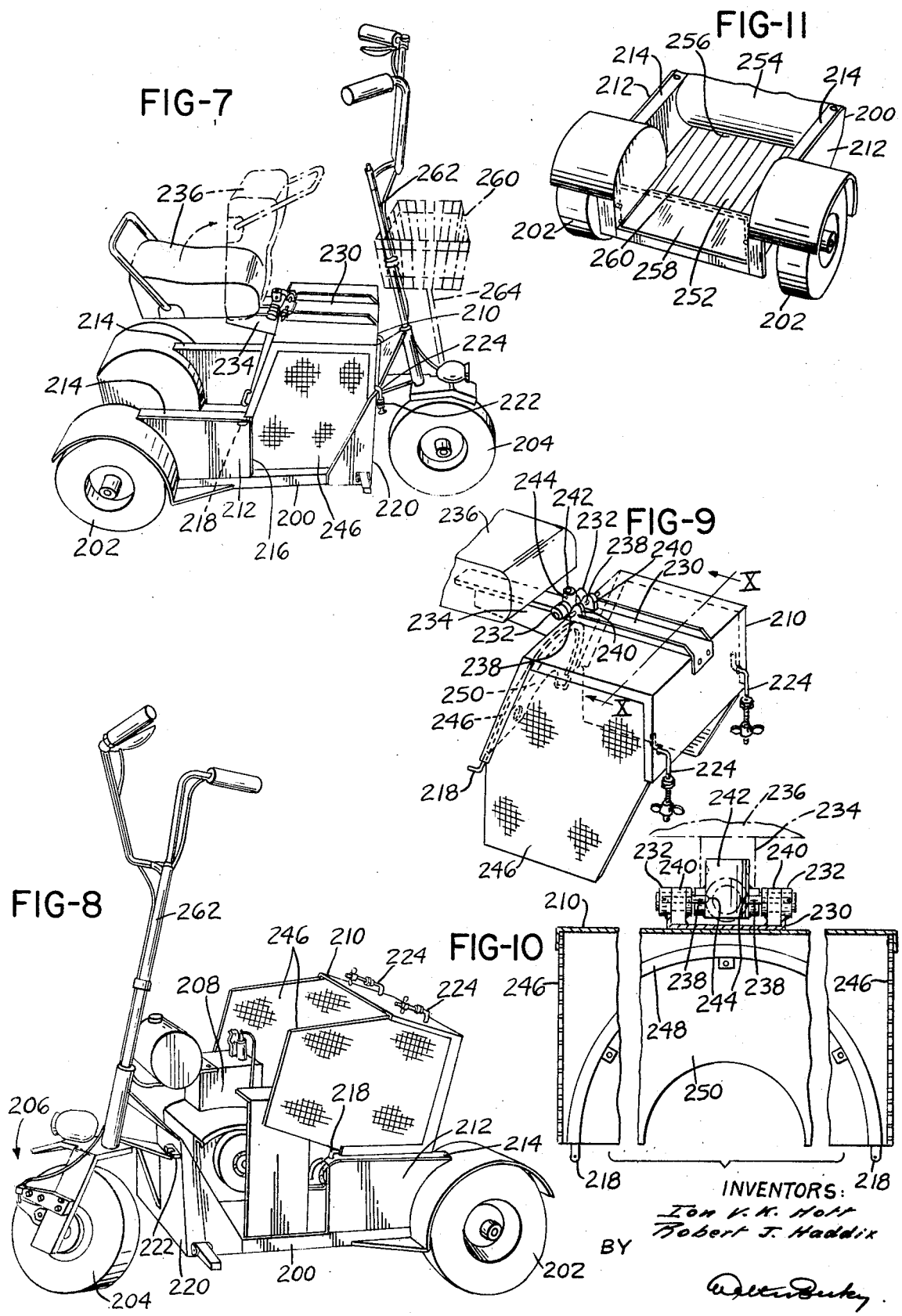

United States Patent Office 3,512,599
Patented May 19, 1970

3,512,599
ENGINE DRIVEN SCOOTER
Ion V. K. Hott and Robert J. Haddix, Dayton, Ohio, assignors to The Joyce-Cridland Company, Dayton, Ohio
Filed Dec. 21, 1967, Ser. No. 692,411
Int. Cl. B62d 3/00
U.S. Cl. 180—27          18 Claims

ABSTRACT OF THE DISCLOSURE

Scooter with drive engine having a differential between the engine and the rear wheels and a brake for braking the differential or its input member and a centrifugal clutch between the engine and the input member of the differential.

---

This invention relates to scooter type vehicles and is particularly concerned with an engine driven scooter.

Scooters are, of course, well known and are known to be powered by internal combustion engines.

The present invention has as a primary objective the provision of an improved scooter type vehicle of the nature referred to.

A particular object of the invention is the provision of an improved driving and braking arrangement for an engine driven scooter.

Another object of the invention is the provision of an engine driven scooter which is inexpensive to construct and maintain.

Still another object of the invention is the provision of a scooter structure in which the parts are so arranged that the scooter can be made for use with or without a seat.

It is also an object to provide a novel combination differential and brake structure for an engine driven scooter.

The foregoing objects as well as other objects and advantages of the present invention will become more apparent upon reference to the following detailed specification, taken together with the accompanying drawings, in which:

FIG. 1 is a side perspective view of an engine driven scooter according to the present invention;

FIG. 2 is a view like FIG. 1 but looking at the opposite side of the scooter;

FIG. 3 is a perspective view from the rear of the scooter;

FIG. 4 is a schematic view of the drive train that connects the scooter engine with the wheels thereof;

FIG. 5 is a view showing a disc brake for the front wheel of the scooter;

FIG. 6 is a view of the brake looking in the direction of line VI—VI of FIG. 5;

FIG. 7 shows a modification in side elevation;

FIG. 8 shows the modification of FIG. 7 from the other side and with the engine cover tilted up;

FIG. 9 shows the removable engine cover and the tiltable seat of the modification of FIGS. 7 and 8;

FIG. 10 is a section on line X—X of FIG. 9; and

FIG. 11 is a perspective view of the FIGS. 8 and 9 modification showing the desk behind the engine.

Referring to the drawings more in detail, the scooter has a main frame which forms a cargo or passenger platform 10. Laterally spaced rubber-tired rear wheels 12 are provided at the rear end of platform 10 and are enclosed about the upper and front portions by fenders 14.

At the front, platform 10 has an upstanding portion 16 and fixed thereto is bearing 18 through which extends column 20. At the bottom end column 20 has a wheel support means 22 in which is journalled rubber-tired front wheel 24. Wheel support means 22 may be a fork or a single arm having a wheel support shaft fixed thereto, as shown.

At the upper end, column 20 has handlebars 26 so the column can be rotated to turn wheel 24 and thereby steer the scooter. Fender 28 partly encloses front wheel 24 and may carry a light or horn at 30.

Mounted on platform 10 near the front is an engine 32 which may be of a conventional type. The engine has a spark plug 34, a carburetor 36, an air cleaner 38, a manual starter 40, and an output shaft 42. Fuel tank 44 is carried above and in front of the engine and supplies fuel to carburetor 36 through tube 46. Lever or button 35 is, as is known, movable into position to short out the spark plug and stop the engine.

Output shaft 42 carries a sprocket or pulley 48 and a centrifugal clutch 50 by means of which driving connection of shaft 42 with sprocket or pulley 48 is established at a certain engine speed.

Rearwardly of engine 32 is a sprocket or pulley 52 and drive element 54 is entrained over elements 48 and 52. When these elements are sprockets, as shown, drive element 54 is a chain and, when elements 48 and 52 are pulleys, drive element 54 is a belt.

Sprocket 52 forms the input member of a differential unit 60, seen in section in FIG. 5. Sprocket 52 is bolted to housing 62 mounted in which is bevel gear means 64 meshing with bevel gear 66 on shaft 68 and with bevel gear 70 on shaft 72. Both shafts 68 and 72 take a bearing in housing 62 as shown.

Each of shafts 68, 72 is also supported in a respective bearing or pillow blocks 74 near the side edge of platform 10. Sprockets 76 on the outer ends of shafts 68, 72 are connected by chains 78 with sprockets 80 on the respective rear wheels 12.

The differential 60 permits the rear wheels to turn at different speeds when the scooter is taking a bend to reduce tire wear and power requirements.

The bearings 74 are preferably supported on cushions as, for example, the rubber blocks indicated at 82. The member 100 is positioned on platform 10 and upstands therefrom and at the top carries a seat 102. Seat 102 may be tiltable forwardly if so desired to clear the cargo space.

The front wheel is provided with a disc-type brake 90 operated by a lever 92 on the handlebar according to known practices, if so desired.

Handgrip 94 on the handlebar can be rotatable and connected with the engine throttle for speed control.

When the scooter has a seat, pins 104 are provided for foot rests. Further, panel 106 upstanding from platform 10 encloses the end of the engine from which the drive is taken.

Chains 78 have guards 108 and fenders 14 are slotted for receiving the chains.

Rear wheels 12 are independently journalled on the vertical panels 110 at the sides of the rear end of the platform 10 so platform 10 can be disposed at a convenient low level.

The frame of the scooter is a fairly simple weldment and may be of relatively light material but is, nevertheless, made stiff because of flanges along the edges thereof and by the fenders for the rear wheels and the guards for chains 78, both of which are welded to platform 10 and to each other. The strap 112 which covers sprocket 52 also adds stiffness to the scooter frame. As will be seen in FIGS. 1 and 2 the upstanding front portion 16 at the front end of platform 10 has turned back side parts 17 so that a strong box-like construction is provided to withstand the stresses imposed on the front end of the scooter. The bearing 18 is connected to portion 16 by a laterally braced plate so that column 20 is also strongly supported on the scooter frame.

Brake 90, previously referred to, is shown somewhat more in detail in FIGS. 5 and 6. In these figures, it will be noted that there is a brake disc 120 fixed to front wheel 24 so as to rotate therewith. A floating block 122 is slidably disposed on pins 124 that are fixed to a plate 126 that is, in turn, attached to wheel support means 22. The two legs of member 124 carry braking discs 128 and a lever 130 is operable by flexible cable 132 to press the braking discs 128 toward each other into braking engagement with disc 120 or to release the braking discs so that they will separate from disc 120. Lever 92 on the handlebar is operatively connected with cable 132 for selective actuation of the disc brake in a conventional manner.

As will be seen in FIG. 4, a brake 91, of the nature referred to above, could be associated with any one or more of the sprockets 52 or 80. In this case, the brake elements would engage the sprockets radially inwardly from the teeth thereof.

FIGS. 7 through 11 show a modification of the present invention. In these figures the scooter has a frame 200 which is substantially the same as has been described in connection with the first modification. The frame has driven rear wheels 202 and a steering double front wheel 204. The front wheel 204 is provided with a disc brake means 206 of the type described above.

In the modification of FIGS. 7 to 11 the engine 208 is provided with a tiltable and removable cover 210. The frame 200 of the scooter embodies the chain guard portions 212 which are in the form of box-like members and each of which has a horizontal upper portion 214 and a vertical front portion 216. The engine cover 210 has vertical back edges which engages the vertical front portions 216 of the chain guards, and the chain guards are provided with apertures for receiving the pivot pins 218 on the engine cover.

The upstanding front portion 220 of the vehicle frame is provided with notched plates 222 which receive the bolts 224 carried on the front of the engine cover. When the bolts 224 engage the slotted plates 222 the engine cover is firmly and fixedly held in place as is illustrated in FIG. 7. However, upon loosening the bolts 224 and disengaging them from the plates 222, the engine cover can be tilted backwardly to the position in which it is illustrated in FIG. 8, and in which position the engine is exposed for servicing. Furthermore, the engine cover can be lifted completely off the scooter frame in case extensive servicing of the engine or the drive components is required.

As will be seen in FIGS. 7, 9 and 10, a channel shaped member 230 extends across the top of the engine cover in the fore and aft direction. Toward the back of the channel shaped member, upstanding ear portions provide hinge means at 232. A seat supporting bracket 234 is pivotally supported at 232 to member 230 and, in operative position, extends rearwardly therefrom and supports seat 236. Seat 236 can be swung forwardly so as to rest on top of the engine cover when desired either to admit cargo being mounted on the platform of the scooter frame or to permit the operator to stand thereon.

When the seat is swung to its forward position, it can be latched in place by virtue of spring plungers 238 carried in lugs 240 which are mounted on channel member 230 immediately forwardly of the pivot means 232. The bracket 234 of the seat has a projection 242 thereon with holes or indentations 244 which the spring plungers 238 engage when the seat is moved to its forward or collapsed position so that the seat is retained in that position.

The engine cover preferably has screening 246 for ventilation of the engine while the front, top and back portions of the engine cover are formed of sheet metal. The engine cover is strengthened so as to be able to support the weight of an operator seated on seat 236 by a reinforcing support ring 248 welded or riveted or otherwise secured on the inside of the back panel 250 of the engine cover.

As will be seen in FIG. 11, the frame 200 includes a deck portion 252 and at the front end of the deck portion there may be a curved plate 254 covering the back of the engine at the bottom and also covering the transversely extending drive shaft and this plate may be spaced from the floor to provide toe space at 256. As will also be seen in FIG. 11, the deck may be provided with an end gate 258 which could pivot to a downward position to provide for an elongated loading space.

As will also be seen in FIG. 7, a carrying basket 260 could be mounted on the steering column 262 and braced on the front wheel cover by braces 264.

The engine cover 210 which, as will be seen, comprises imperforate front, top and back walls and perforated side walls and may advantageously have the front top and back walls formed of glass fiber material. It will be seen that the arcuate member 248 supports this material against deflection by the weight of the seat and likewise stiffens the entire engine cover. Furthermore, member 248 may advantageously be employed for supporting the hinge pins 218, previously referred to, which engage holes in the chain guards 212.

The aforementioned platform 252 of the back deck has a rubber or rubber-like pad 260 thereon and the tailgate 258 is of such thickness that when it is folded down in the forward direction the platform has a flush surface running from front to back thereof. When the tailgate is elevated and latched in its upper position the platform of the vehicle is useful for carrying loose articles, whereas, when the tailgate is forwarded downwardly longer articles can be supported on the platform.

It will be understood that this invention is susceptible to modification in order to adapt it to different usages and conditions; and accordingly, it is desired to comprehend such modifications within this invention as may fall within the scope of the invention.

What is claimed is:

1. A scooter type vehicle having a frame with a pair of laterally spaced driven rear wheels and a single steerable front wheel, said frame having a passenger and cargo platform and a drive engine on the platform at the front, said platform including wheel wells for said rear wheels integral with the platform and each comprising an arcuate fender portion about a portion of the periphery of the respective wheel and a vertical wall at the inner side of the respective wheel, an axle for each said rear wheel supported on the respective vertical wall above the level of said platform so the said platform is disposed below the axis of rotation of the rear wheels, said engine having an output shaft with a first drive member thereon, a second drive member on the platform rearwardly of the engine drivingly connected the first drive member, said first and second drive members being in the form of first and second sprockets respectively, a chain entrained over said sprockets; a differential having said second drive member as the input member and having a pair of output members, said output members of said differential being respective drive shafts, bearings at the sides of said platform supporting said drive shafts, drive means connecting each output member with a respective rear wheel, said drive means comprising sprockets on said drive shafts and on said rear wheels and chains entraned over the said sprockets, a column in a vertical plane at the front end of the platform rotatable thereon and supporting said front wheel at the lower end and having steering means at the upper end, said engine having a throttle and manual means on said steerable means for operating said throttle, brake means for said vehicle, said platform having panels fixed to the sides upstanding along the inner sides of said drive means and fixed to said fenders at the back edges of the panels, said fenders being slotted for the passage therethrough of the chains of said drive means.

2. A scooter type vehicle according to claim 1 in which said brake means is on said front wheel.

3. A scooter type vehicle according to claim 1 in which said brake means is in the form of a disc nonrotatably connected to said front wheel, brake elements on opposite sides of said disc, and manually operable means for moving said braking elements into frictional engagement with said disc.

4. A scooter type vehicle according to claim 1 in which said differential comprises a housing fixed to said second sprocket, each drive shaft extending into said housing and being journalled therein, and said bearings at the sides of said platform having a cushioned support on said platform.

5. A scooter type vehicle according to claim 1 in which a centrifugal clutch is interposed between said engine output shaft and said first sprocket.

6. A scooter type vehicle according to claim 1 in which said platform includes a tail gate member pivoted to the rear end thereof and moveable to a vertical position between said vertical walls at the inner sides of the rear wheels.

7. A scooter type vehicle according to claim 6 in which said tail gate is foldable forwardly flat against said platform and the platform has a mat extending from the front edge of the folded over tail gate forwardly and of the same thickness as the folded over tail gate.

8. A scooter type vehicle according to claim 1 in which said brake means is a disc type brake associated with one of said sprockets, said brake comprising brake elements engageable with opposite sides of said one sprocket in a region radially inwardly of the teeth thereof.

9. A scooter type vehicle having a frame with a pair of laterally spaced driven rear wheels and a single steerable front wheel, said frame having a passenger and cargo platform and a drive engine on the platform at the front, said engine having an output shaft with a first drive member thereon, a second drive member on the platform rearwardly of the engine drivingly connected to the first drive member, a differential having said second drive member as the input member and having a pair of output members, drive means connecting each output member with a respective rear wheel, a column in a vertical plane at the front end of the platform rotatable thereon and supporting said front wheel at the lower end and having steering means at the upper end, said frame comprising a flat horizontal panel forming said platform, vertical flange means fixed to the side edges of the panel to stiffen it, an upstanding portion at the front end of said panel having bearing means for said column, wings extending backwardly from the side edges of said upstanding portion and fixed at their lower edges to the sides of said panel to form a rigid box-like front end structure for the scooter frame, said engine having a throttle and manual means on said steerable means for operating said throttle, brake means for said vehicle, said bearing means for said column being a tubular element, a vertical support plate fixed at its front edge to said tubular element, and at its back edge to said upstanding portion at the front end of said panel, and horizontal support plates extending from upper end lower regions of said tubular element rearwardly to and fixed to said upstanding portion and also fixed to said vertical support plate.

10. A scooter type vehicle having a frame with a pair of laterally spaced driven rear wheels and a single steerable front wheel, said frame having a passenger and cargo platform and a drive engine on the platform at the front, a detachable engine cover for said engine, said cover having front, top and back walls and also having perforate side walls for engine cooling air, said engine having an output shaft with a first drive member thereon, a second drive member on the platform rearwardly of the engine drivingly connected to the first drive member, a differential having said second drive member as the input member and having a pair of output members, drive means connecting each output member with a respective rear wheel, a column in a vertical plane at the front end of the platform rotatable thereon and supporting said front wheel at the lower end and having steering means at the upper end, said engine having a throttle and manual means on said steerable means for operating said throttle, brake means for said vehicle, a seat, a seat support member extending to the back edge of the top wall of said engine cover, and pivot means pivotally connecting the front end of said support member to the back edge of the top wall of said engine cover for pivotal movement of the seat from a horizontal working position on top of said engine cover.

11. A scooter type vehicle according to claim 10 in which said column and front wheel are disposed in a common vertical plane, a bracket on the lower end of the column having a single arm extending along one side of the front wheel, and shaft means carried by said arm and supporting said front wheel.

12. A scooter type vehicle according to claim 10 in which an upstanding bracket is mounted on said platform and said seat is provided on the upper end of said bracket.

13. A scooter type vehicle according to claim 12, in which said seat is pivotal upwardly about its front edge.

14. A scooter type vehicle according to claim 10, which includes channel-like means extending across the top wall of said engine cover in the fore and aft direction and having an element of said pivot means at the rear end cooperating with another element of said pivot means at the front end of said seat support member.

15. A scooter type vehicle according to claim 14, which includes cooperating elements of detent means on said channel-like means and support member for releasably detaining said seat in its idle position.

16. A scooter type vehicle according to claim 15, in which said support member includes means for engaging the back wall of said engine cover to support the support member and seat in working position, and said engine cover includes reinforcing means fixed to and supporting the back wall thereof.

17. A scooter type vehicle according to claim 10 in which the engine includes a spark plug, and a member on the engine moveable into position to short out the spark plug and halt the engine.

18. A scooter type vehicle having a frame with a pair of laterally spaced driven rear wheels and a single steerable front wheel, said frame having a passenger and cargo platform and a drive engine on the platform at the front, a detachable engine cover for said engine, said cover having front, top and back walls and also having perforate side walls for engine cooling air, said engine having an output shaft with a first drive member thereon, a second drive member on the platform rearwardly of the engine drivingly connected to the first drive member, a differential having said second drive member as the input member and having a pair of output members, drive means connecting each output member with a respective rear wheel, a column in a vertical plane at the front end of the platform rotatable thereon and supporting said front wheel at the lower end and having steering means at the upper end, said engine having a throttle and manual means on said steerable means for operating said throttle, brake means for said vehicle, said engine cover including pivot means at the lower edge of the back wall pivotally connecting the engine cover to said frame for tilting of the engine cover from engine enclosing position to engine exposing position, and detachable clamp means on the front wall of said engine cover and on the said frame adjacent thereto for clamping the engine cover in engine enclosing position.

References Cited

UNITED STATES PATENTS 2,237,677  4/1941  Lewis _____ 180—33

(Other references on following page)

References Cited

| | | | |
|---|---|---|---|
| 2,365,609 | 12/1944 | Wahlberg | 180—64 |
| 2,556,101 | 6/1951 | Negin et al. | 296—57 |
| 2,612,968 | 10/1952 | Hood | 188—73 X |
| 3,062,329 | 11/1962 | Erickson | 188—24 X |
| 3,094,187 | 6/1963 | Horowitz | 180—27 |
| 3,166,141 | 1/1965 | Shields et al. | 180—19 X |
| 3,289,780 | 12/1966 | Ferris | 180—65 X |
| 3,367,439 | 2/1968 | Zweben | 180—104 |
| 3,433,318 | 3/1969 | Packard | 180—31 X |

KENNETH H. BETTS, Primary Examiner

U.S. Cl. X.R.

180—70; 296—65